United States Patent
Nasielski et al.

(10) Patent No.: US 8,160,580 B2
(45) Date of Patent: Apr. 17, 2012

(54) SYSTEMS AND METHODS FOR HOME CARRIER DETERMINATION USING A CENTRALIZED SERVER (75) Inventors: John Wallace Nasielski, San Diego, CA (US); Raymond Tah-Sheng Hsu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 441 days.

(21) Appl. No.: 10/938,731

(22) Filed: Sep. 10, 2004

(65) Prior Publication Data

US 2005/0119000 A1 Jun. 2, 2005

Related U.S. Application Data (60) Provisional application No. 60/503,194, filed on Sep. 15, 2003.

(51) Int. Cl.
H04W 4/00 (2009.01)
(52) U.S. Cl. ..................... 455/433; 455/432.1
(58) Field of Classification Search .................. 455/433, 455/432.1
See application file for complete search history.

(56) References Cited

U.S. PATENT DOCUMENTS

| | | | |
|---|---|---|---|
| 5,239,294 A | | 8/1993 | Flanders et al. |
| 5,815,810 A | * | 9/1998 | Gallant et al. ................. 455/433 |
| 5,839,072 A | | 11/1998 | Chien |
| 6,016,512 A | * | 1/2000 | Huitema ........................ 709/245 |
| 6,104,929 A | * | 8/2000 | Josse et al. .................... 455/445 |
| 6,421,714 B1 | * | 7/2002 | Rai et al. ....................... 709/217 |
| 6,466,964 B1 | | 10/2002 | Leung et al. |
| 6,469,998 B1 | * | 10/2002 | Burgaleta Salinas et al. 370/338 |
| 6,608,832 B2 | * | 8/2003 | Forslow ......................... 370/353 |
| 6,795,701 B1 | * | 9/2004 | Baker et al. ................... 455/411 |
| 7,082,118 B1 | * | 7/2006 | Sethi ............................. 370/349 |
| 2002/0040390 A1 | | 4/2002 | Sullivan et al. ............... 709/219 |
| 2002/0128028 A1 | * | 9/2002 | Stille et al. .................... 455/513 |

(Continued)

FOREIGN PATENT DOCUMENTS

EP 1372298 12/2003

(Continued)

OTHER PUBLICATIONS

International Search Report and Written Opinion—PCT/US2004/030103, International Search Authority—European Patent Office—Jan. 19, 2005.

*Primary Examiner* — Marivelisse Santiago Cordero
(74) *Attorney, Agent, or Firm* — Kristine U. Ekwueme (57) ABSTRACT Systems and methods for determining the home network carrier associated with a mobile station and authorizing the provision of services to the mobile station using centralized storage of mobile station and home network information. In one embodiment, when a roaming mobile station attempts to access services, identifying information for the mobile station is used by a local server to query a centralized DNS server that stores a mapping of mobile station identifying information to corresponding home networks. The centralized DNS server returns an identification of the home network of the roaming mobile user, and the home network then determines whether to grant or deny the mobile station access to the local network. The mobile station identifying information may comprise an MSID such as an MIN, IRM or IMSI, which may serve as part of the address for the query to the centralized DNS server.

32 Claims, 5 Drawing Sheets

U.S. PATENT DOCUMENTS

| | | |
|---|---|---|
| 2003/0139182 A1* | 7/2003 | Bakkeby et al. ............... 455/432 |
| 2004/0058689 A1* | 3/2004 | Muhonen et al. .......... 455/456.1 |
| 2004/0228347 A1* | 11/2004 | Hurtta et al. ............... 370/395.2 |
| 2005/0044242 A1* | 2/2005 | Stevens et al. ................ 709/228 |
| 2005/0118999 A1* | 6/2005 | Zhu ............................ 455/432.1 |

FOREIGN PATENT DOCUMENTS

| | | |
|---|---|---|
| JP | 2001148880 | 5/2001 |
| JP | 2002261761 | 9/2002 |
| WO | 9727717 | 7/1997 |
| WO | WO9727716 A1 | 7/1997 |
| WO | WO9916266 A1 | 4/1999 |
| WO | WO9927680 | 6/1999 |
| WO | 0211467 | 2/2002 |
| WO | WO0211487 | 2/2002 |
| WO | WO03019955 A1 | 3/2003 |
| WO | 03075516 | 9/2003 |

* cited by examiner

SYSTEMS AND METHODS FOR HOME CARRIER DETERMINATION USING A CENTRALIZED SERVER

CLAIM OF PRIORITY UNDER 35 U.S.C. §119

The present Application for Patent claims priority to Provisional Application No. 60/503,194 entitled "Using the DNS for Home Carrier Determination Based on the MSID Prefix" filed Sep. 15, 2003, assigned to the assignee hereof and hereby expressly incorporated by reference herein.

BACKGROUND

1. Field

The present invention relates generally to wireless communication systems, and more specifically to a method for determining the home network carrier of a roaming mobile station that is attempting to access a local network.

2. Background

As the proliferation of wireless devices increases, mobile users often find themselves requesting services from service providers other than their home network providers, i.e. home network carriers. The industry has kept up with this situation by putting in place roaming agreements to provide mobile users with services while outside of their home areas. The local networks then each maintain information (e.g., in lookup tables) that can be used to identify which home networks are associated with roaming users, and which home networks are covered by the different roaming agreements.

When mobile users need service in areas outside the limits of their home networks, they contact a local network to request service. The request often includes a user name and password that is provided by the home network. This user name and password may, for example, be a publicly available user name that is common to many, if not all, users within the same home network carrier. Upon receiving the request from the mobile user, the local network uses its locally stored information to determine which of the home networks is associated with the user and whether, based on that association, the user should be granted the requested services. This may include checking the user name and password in the user's request for service against the authorization information stored with the home network's information.

This arrangement necessities not only the initial expense of setting up the local storage of the information for all of the home networks, but also the recurring expense of maintaining the information in each of the local networks. For instance, when the information associated with carrier A changes (e.g., the status of roaming agreements, user names, passwords, etc.,) this information must be updated in each of the local networks, in case a user associated with network A roams in an area associated with one of the local networks. Delays or errors in the process of updating the network information can cause denials of service to mobile users that otherwise should have been granted access to the local network. This results in frustrated mobile users and lost revenue for both the local network carrier and the home network carrier.

It is clear that the difficulties of maintaining the same home network information in each of the local networks are made worse by scaling. If there are more home networks, there is more information that has to be maintained at each local network. If there are more local networks, the difficulties of keeping the information in all of the local networks are exacerbated. (It may be noted that a given network may be considered a local network or a home network, depending upon the association of the respective networks with particular mobile users.)

There is therefore a need in the art for systems and methods for authorizing access by roaming mobile users to a local network that does not suffer from the drawbacks of conventional systems and methods.

SUMMARY

Embodiments disclosed herein address the above stated needs by providing systems and methods for determining the home network carrier associated with a mobile station and authorizing the provision of services to the mobile station. Broadly speaking, this is accomplished by centralizing the home network information that is conventionally stored in each of the local networks. The local networks then access the centrally stored information, rather than accessing the locally stored and maintained information, in order to authorize access by roaming users to local services.

One embodiment comprises a method implemented in a local server, such as a RADIUS server or VLR. The method includes receiving a request by a mobile station for roaming access to a local network, accessing a remote centralized server to identify the home network associated with the mobile station, and granting or denying access by the mobile station to the local network based at least in part upon which home network is associated with the mobile station.

Another embodiment comprises a method implemented in a centralized server such as a DNS server, wherein the method includes maintaining a central database containing information associating home networks with mobile stations, coupling the central database to several local servers, receiving a query from one of the local servers identifying a first mobile station that wishes to access a local network associated with the local server, and identifying a home network associated with the first mobile station.

Another embodiment comprises a local server associated with a local network. The local server is configured to receive a request by a mobile station for roaming access to the local network, access a remote centralized server to determine which home network is associated with the mobile station, and grant or deny access by the mobile station to the local network based upon the identity of the home network associated with the mobile station.

Yet another embodiment comprises a central server configured to maintain a central database with information mapping home networks to mobile stations, receive queries from local servers, where the queries include information identifying the mobile stations requesting access to the local networks associated with the corresponding local servers, and identify home networks associated with the mobile stations identified in the queries.

Numerous additional alternative embodiments are also possible.

BRIEF DESCRIPTION OF THE DRAWINGS

Various aspects and features of the invention are disclosed by the following detailed description and the references to the accompanying drawings, wherein.

While the invention is subject to various modifications and alternative forms, specific embodiments thereof are shown by way of example in the drawings and the accompanying detailed description. It should be understood, however, that the drawings and detailed description are not intended to limit the invention to the particular embodiments which are described.

DETAILED DESCRIPTION

One or more embodiments of the invention are described below. It should be noted that these and any other embodiments described below are exemplary and are intended to be illustrative of the invention rather than limiting.

As described herein, various embodiments of the invention comprise systems and methods for determining the home network carrier associated with a mobile station and authorizing the provision of services to the mobile station. Broadly speaking, this is accomplished by centralizing the home network information that is conventionally stored in each of the local networks. The local networks then access the centrally stored information, rather than accessing the locally stored and maintained information, in order to authorize access by roaming users to local services.

In one embodiment, a roaming mobile user attempts to access local services (e.g., internet access) by communicating with a packet data serving node via a radio access network (e.g., a CDMA wireless communication system.) The packet data serving node communicates a request to an authentication server to obtain authorization to provide the requested services to the roaming user. The mobile user's request for services includes information identifying the user's mobile device. This identifying information is communicated to the authentication server, which queries a remote centralized server to determine the home network associated with the mobile user. The remote centralized server returns a response that identifies the user's home network (e.g., a home network carrier domain name.) This home network information is then used by the authentication server to determine whether the mobile user should be granted access to the requested services.

Figure 1:
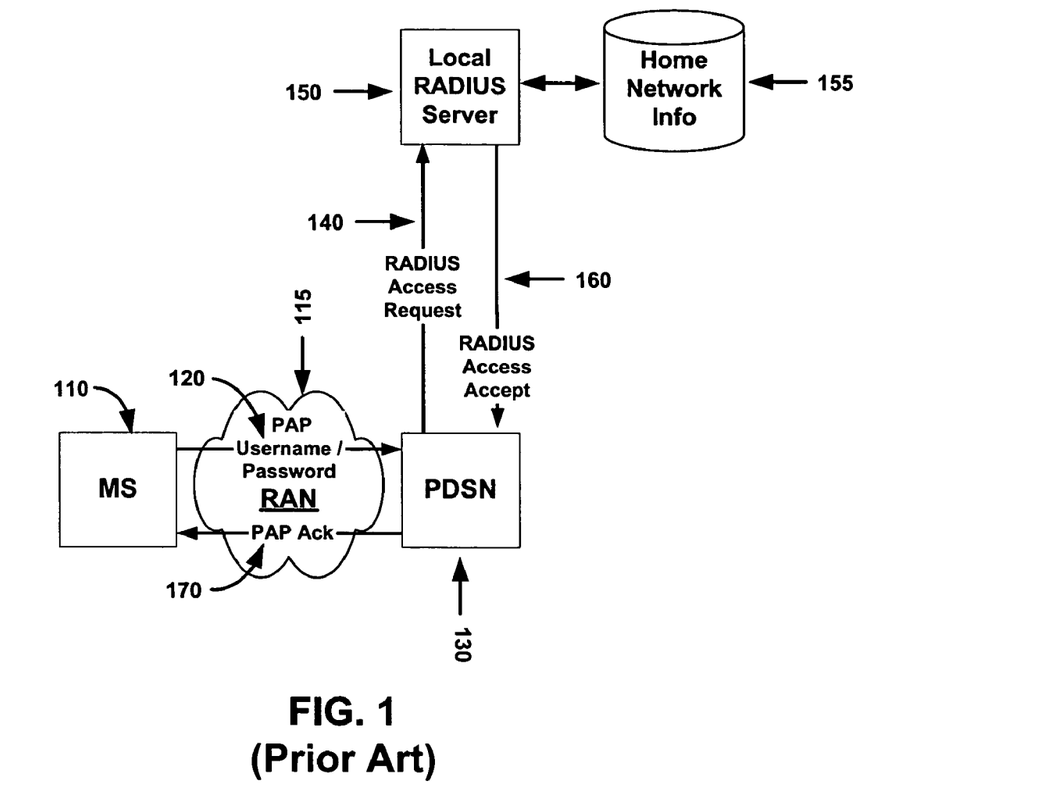
FIG. 1 is a schematic diagram of a prior art wireless local network.

Referring to FIG. 1, a schematic diagram of a roaming wireless mobile station in communication with a prior art local network system is shown. In this conventional system, a user of mobile station 110, while roaming, may wish to access the local network to obtain service (e.g., internet access.) Mobile station 110 communicates via radio access network (RAN) 115 to establish a communication link with a packet data service node (PDSN) 130. Once the communication link has been established, a username/password 120 is communicated to PDSN 130 using a password authentication protocol (PAP.) This is done so that the user can be authenticated by PDSN 130 prior to providing services to mobile station 110.

PDSN 130 generates a remote authentication dial-in user service (RADIUS) request 140 and forwards the request to local RADIUS server 150, which authenticates the username/password. The local RADIUS server 150 includes a database 155. Database 155 stores information on those home networks for which roaming users may attempt to access services via the local network. This information normally includes tables or other information for identifying the home networks associated with roaming mobile stations that have requested access to the local network.

After local RADIUS server 150 has determined with which home network mobile station 110 is associated, it can be determined whether or not mobile station 110 should be given access to the requested services. This is done by comparing the username/password provided by mobile station 110 to a username/password associated with the home network. The home network's username/password may be stored in RADIUS server 150, or RADIUS server 150 can formulate a query and forward the query to a home RADIUS server (not shown) associated with the home network of mobile station 110.

Based on the comparison of usernames/passwords, RADIUS server 150 authenticates mobile station 110. Whether the username/password is authenticated by the local RADIUS server 150 or the home RADIUS server, a RADIUS access accept message 160 is then forwarded to PDSN 130. PDSN 130, in response to the RADIUS access accept message, forwards a PAP acknowledgement 170 to mobile station 110. Mobile station 110 is then allowed access to the requested services.

During the above described process, a failure at the PPP level or a delay in response from PDSN 130, local RADIUS server 150 or the home RADIUS server will result in a denial of service for mobile station 110.

The prior art, as described above, requires that each local RADIUS server 150 maintain a database (or some other data structure) containing information for numerous other networks, particularly for every other carrier with which the local network is partnered. As pointed out above, this arrangement is expensive in terms of additional overhead, maintenance of both the equipment and the data contained within the database, and so on.

It may be useful before proceeding to describe the various embodiments of the invention to define a number of terms. These terms include:

BS—base station;
CDG—CDMA Development Group;
CDMA—code division multiple access;
DNS—domain name system;
HLR—home locator register;
IMSI—international mobile subscriber identity;
IRM—international roaming MIN;
MIN—mobile identification number;
MS—mobile station;
MSC—mobile switching center;
MSID—mobile station ID;
PAP—password authentication protocol;
PDSN—packet data serving node;
RADIUS—remote authentication dial-in user service;
RAN—radio access network;
VLR—visitor locator register.

It should be noted that mobile stations may include any wireless device capable of accessing the radio access network, such as a personal digital assistant (PDA,) notebook computer, cellular telephone, 2-way communication devices, pager or the like (this list is intended to be exemplary and not exhaustive). A person of ordinary skill in the art will appreciate and understand that many other devices can access the RAN or be adapted to access the RAN and still fall within the scope and teachings of the several embodiments of the present invention. Furthermore, the type of system in which the MS operates is not limited, and may include CDMA, TDMA, GSM or other types of wireless communication systems.

Service or services that may be requested by the mobile station may include either voice or data packet type services, such as but not limited to voice transmissions, voice mail, e-mail, text messaging, instant messaging, internet access, telephony, streaming audio, streaming video, online games, Internet radio and so on.

Figure 2:
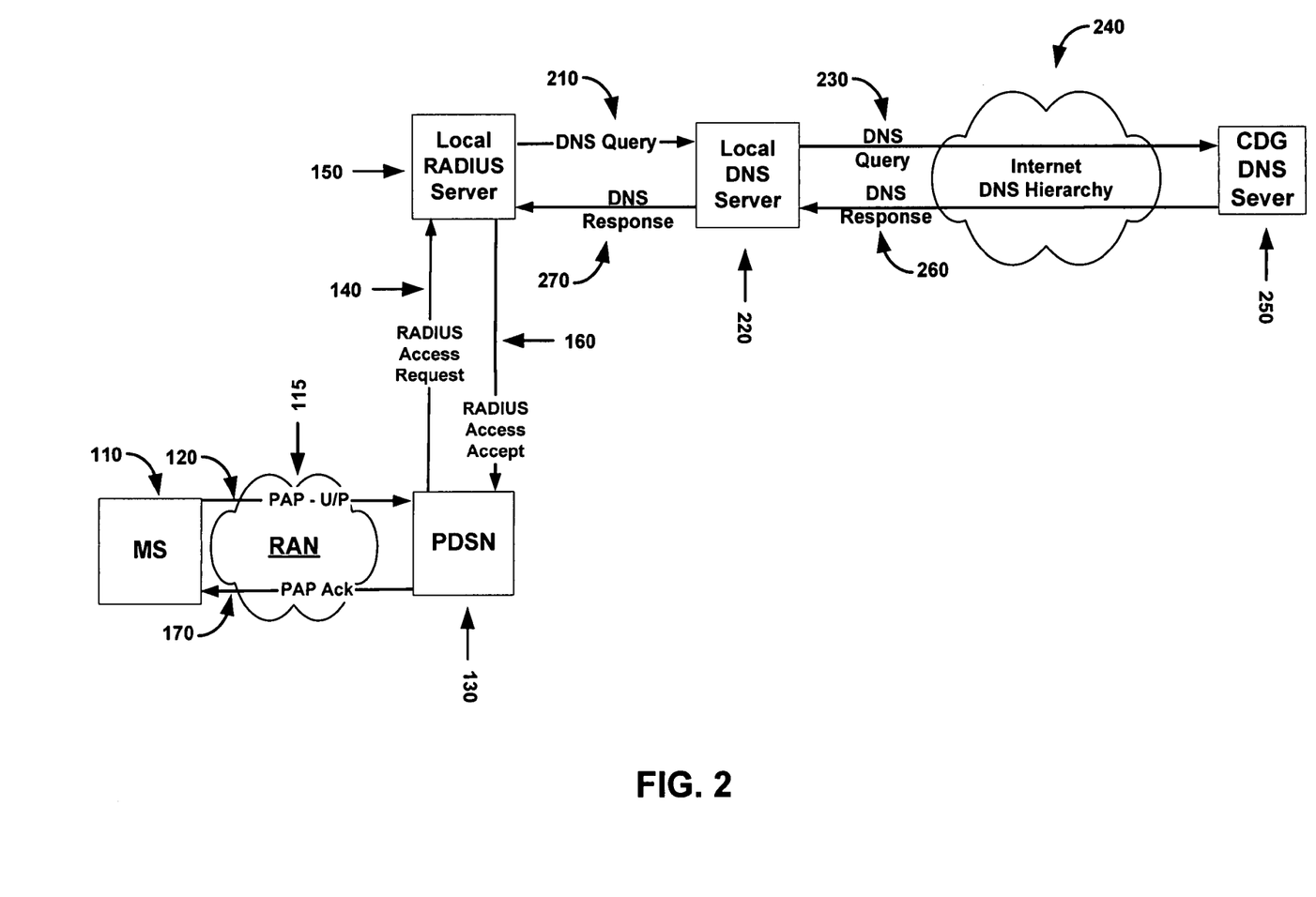
FIG. 2 is a schematic diagram of a local wireless network in communication with a remote centralized server of one embodiment of the present invention.

Referring to FIG. 2, a schematic diagram of a roaming wireless mobile station in communication with a local network system in accordance with one embodiment of the invention is shown. The reader should note that reference numerals, 110, 115, 120, 130, 140, 150, 160 and 170 correspond to the identically numbered items in FIG. 1.

In this embodiment, MS 110 again communicates with PDSN 130 via RAN 115. PDSN 130, in turn, communicates with local RADIUS server 150. At this point, the configuration of the system begins to diverge from the system of FIG. 1. Rather than having a local database in which the home network information is stored, local RADIUS server 150 is coupled to a remote, centralized server that stores this information. When the information is needed by local RADIUS server 150, a request is sent to the remote, centralized server, which then responds with the information. In FIG. 2, the remote, centralized server consists of CDG DNS server 250. Local RADIUS server 150 is coupled to the CDG DNS server 250 through a local DNS server 220 and the normal internet DNS hierarchy 240.

In one embodiment, the home network information stored by the remote, centralized server consists of a mapping from the MSID prefix of a MS (which is requesting access to the local network's services) to the MS's home network name. The RADIUS 150 server utilizes the Mobile Station ID (MSID), which can be a Mobile Identification Number (MIN), International Roaming MIN (IRM), or International Mobile Subscriber Identity (IMSI), to determine the MS's home network for voice services. For example, the first six digits of a MIN can be mapped to a carrier name. In the embodiment of FIG. 2, the MSID-to-home-network mapping table is stored and maintained centrally in a DNS server under the authority of a single organization.

It should be noted that the remote, centralized server need not consist of a single server or database, but can be a distributed database or server system, depending on the size and the needs of the system. For instance, the remote centralized database can be mirrored to multiple primary or secondary sites to provide back-up capacity, server redundancy, or increased performance in the event that a primary server fails or has reduced performance due to high traffic conditions. It is anticipated that the remote centralized server (e.g. CDG DNS server) will consist of less than the number of local RADIUS servers that access the home network information.

It should also be noted that, although the centrally maintained server depicted in FIG. 2 is under the authority of CDG (the CDMA Development Group,) this need not be the case in other embodiments. The central server may be maintained by other entities that may include standards organizations within the industry, commercial enterprises, non-profit organizations, or even individuals. References herein to CDG (e.g., "CDG DNS server" and "cdg.org") should therefore be construed broadly to refer to any such entity that maintains a central server or server system in accordance with the present disclosure.

References to other terms in the present disclosure should also be construed broadly, unless otherwise specified herein. For example, references to "PAP" should be construed to teach the use of any suitable authentication protocol (e.g., PAP, CHAP, etc.,) rather than a single, specific protocol. Similarly, references to "RADIUS" servers should be construed to cover various different types of remote or roaming access (e.g., VLR) severs, and references to "MSID" should be construed to cover various types of identifying information corresponding to the described roaming devices.

In one embodiment, the roaming MS 110 desires Internet access and sends the publicly available username and password (provided to the MS by its home network) via PAP to the local serving network for authorization. The MSID for MS 110 is communicated to the PDSN 130 when a connection is established between the MS 110 and the PDSN 130. The PDSN 130 sends RADIUS Access-Request 140 to the local RADIUS server 150. The RADIUS Access-Request 140 contains the MS's username, password, and MSID.

The local RADIUS server 150 sends a DNS Query 210 to a local DNS server 220. In this embodiment, the local DNS server 220 is a generic server utilized simply to manage connections and transmissions to and from the internet DNS hierarchy 240. Local DNS server 220 transmits DNS Query 230 to Internet DNS hierarchy 240 which provides links to CDG DNS server 250. The DNS query 230 is forwarded to the DNS server 250, which, in this case, is maintained by CDG.

If the DNS server 250 has the mapping from the MSID prefix to a home network's domain name, the DNS server 250 returns a DNS Response 260 containing the home network's domain name. In some embodiments, the local RADIUS and DNS servers may cache the MSID-to-home-network mapping provided via the DNS Response. The caching of this information may enable the system to more quickly determine whether or not to authorize future access requests by eliminating the time required for the DNS query and response. The caching of the home network information may be retained and discarded in accordance with any suitable caching policy.

Upon receiving the DNS Response, the local RADIUS server 150 can determine whether or not to authorize access by the MS 110 in several ways. For instance, in one embodiment, local RADIUS server 150 compares the home network identified in the DNS Response with a set of locally stored roaming agreements. Each of the roaming agreements identifies a corresponding home network with which the local serving network has an agreement to provide roaming services. If the home network identified in the DNS Response is included among the home networks with which the local serving network has roaming agreements, then the local RADIUS server will authorize the MS to access requested services in accordance with the respective roaming agreement. The roaming agreements may authorize access by all users associated with the respective home network, or they may require that appropriate usernames/passwords be provided by the users. If appropriate, the local RADIUS server 150 sends the RADIUS Access-Accept 160 to the PDSN 130, which then sends the PAP Acknowledgement to the MS 110.

In another embodiment, rather than comparing the home network identified in the DNS Response with the home networks for which there are roaming agreements, the local RADIUS server can simply contact a RADIUS server for the home network. If the RADIUS server for the home network approves authorization of the access requested by the MS, a corresponding response will be provided to the local RADIUS server. The local RADIUS server will then authorize the requested access by the MS.

It should be noted that these two methods for determining, based on the identification of the home network associated with the MS, whether to grant access to the MS can also be combined in other embodiments. In one possible embodiment, after receiving the DNS Response from the CDG DNS server, the local RADIUS server may attempt one method, and then the other. For example, the local RADIUS server may first determine whether the home network is included among the networks with which the local network has roaming agreements. If there is a roaming agreement with the home network, then access is authorized. If there is no roaming agreement with the home network, then the local RADIUS server contacts the RADIUS server of the home network to determine whether access should be authorized. If the home RADIUS server approves authorization, the local RADIUS server sends an authorization response to the PDSN. If the home RADIUS server does not approve authorization, the local RADIUS server sends a response to the PDSN denying access.

In a further embodiment, if the MS 110 desires voice services, the process to authenticate the MS 110 and determine the MS home carrier is essentially the same as described above for Internet access (i.e. data packet service). In referring to FIG. 3 the reader should note that only the differences between the method described for voice services, depicted by FIG. 3, and Internet access as depicted in FIG. 2 will be discussed.

Figure 3:
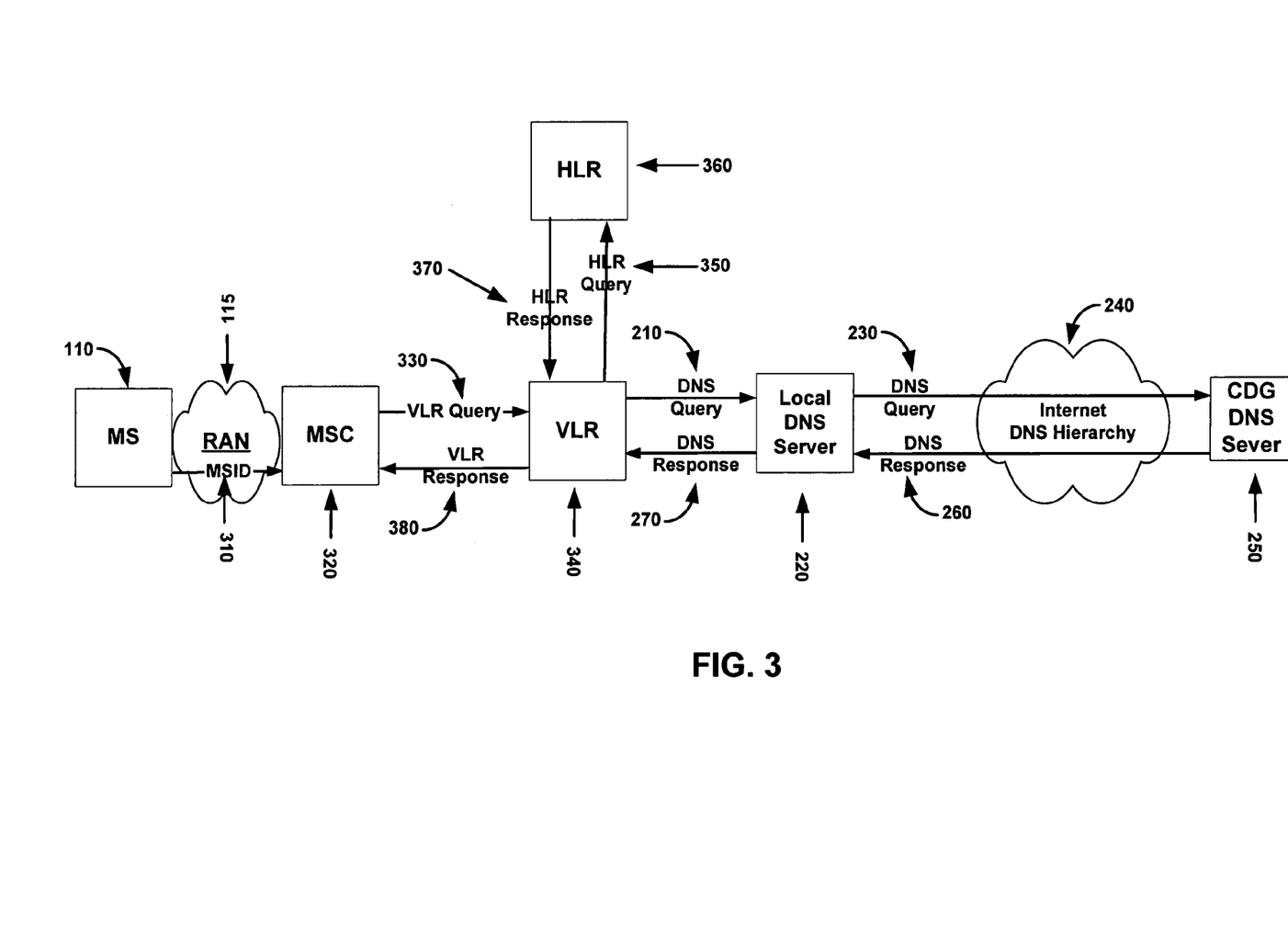
FIG. 3 is a schematic diagram of a local wireless network in communication with a remote centralized server of an alternate embodiment of the present invention.

The MS 110 access request is made to mobile switching center (MSC) 320 which formulates and transmits a visitor locator register (VLR) query 330 to VLR 340. VLR 340 receives the MS's MSID 310 and formulates a DNS query which is transmitted to the CDG DNS server 250 which responds with the domain name of the carrier, (i.e. the home carrier of the MS). VLR 340 then formulates and transmits a home locator register (HLR) query 350 to HLR 360. HLR 360 is associated with the home carrier of MS 110 identified by CDG DNS server 250. HLR 360 transmits an HLR response 370 to VLR 340, which in turn transmits a VLR response 380 to MS 110. In this embodiment the DNS server 250 and VLR 320 may cache the DNS server response also.

In all other aspects the embodiments of the present invention depicted by FIGS. 2 and 3 are essentially the same.

As noted above, the serving network's RADIUS server formulates a DNS query based on the MSID and receives a DNS response containing MS's home network information. The MSID is normally transmitted by the MS to the PDSN, so it is conveniently captured and utilized for forming queries to determine the home network carrier. The first several bits of a MSID usually can be associated with a carrier and are captured by PDSN 130 and utilized to formulate a query to be forwarded to local RADIUS server 150.

If the MSID consists of a MIN, the first 6 digits can be associated with a carrier, and the first digit is defined to be between 2 and 9. For the IRM, the first 4 digits can be associated with a carrier, and the first digit is defined to be either 0 or 1. For the IMSI, the first 5 digits can be associated with a carrier.

Figures 4A, 4B:
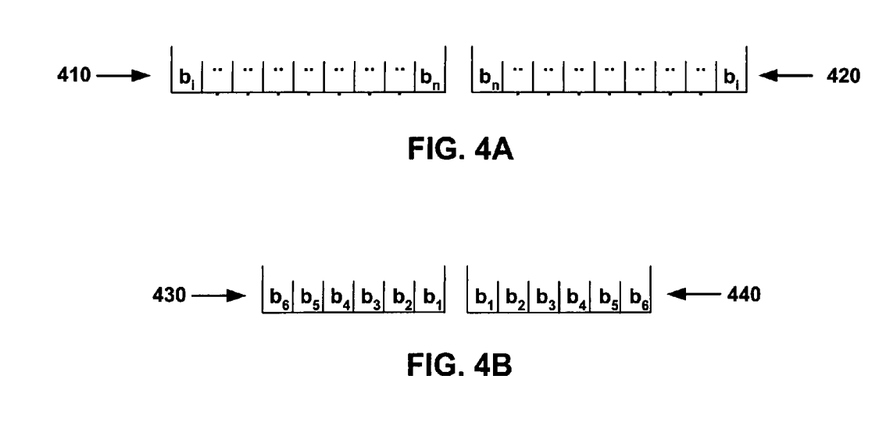
FIG. 4A-4D is a schematic diagram of data bit array captured from a mobile station ID used to construct a query for the remote centralized server of one embodiment of the present invention.

FIGS. 4A-4D depict a schematic diagram of the mobile station 110 MSID parsed into several digit arrays for inclusion in the DNS query as described above. MSID Array 410 of FIG. 4A depicts a generic array, wherein $b_n$ depicts the first digit captured of the mobile station 110 MSID and $b_i$ the i-th digit of the MSID. Reference numeral 420 represents an array of captured digits where the order of the digits are reversed for inclusion in the DNS query. In this scenario, the DNS query will take the form of $b_i \ldots b_n$.msid.cdg.org with respect to array 410 and $b_n \ldots b_i$.msid.cdg.org with respect to array 420 (where cdg.org is simply an exemplary domain name at which the DNS server resides.)

FIG. 4B is a schematic diagram of a MSID capture array 430 for a MIN, wherein the DNS query name takes the form of $b_6.b_5.b_4.b_3.b_2.b_1$.min.cdg.org, where bi is the i-th bit of the MIN.

Figure 4C:
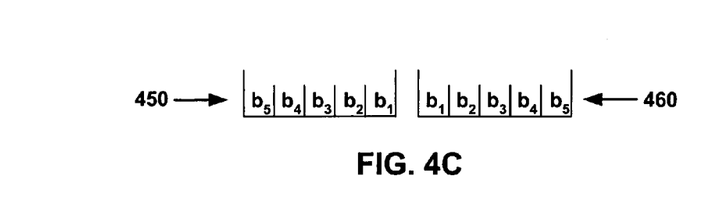

FIG. 4C is a schematic diagram of a MSID capture array 450 for a IMSI, wherein the DNS query name takes the form of $b_5.b_4.b_3.b_2.b_1$.imsi.cdg.org, where bi is the i-th bit of the IMSI.

Figure 4D:
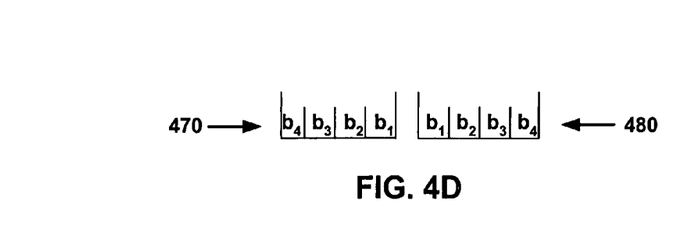

FIG. 4D is a schematic diagram of a MSID capture array 470 for a IMSI, wherein the DNS query name takes the form of $b_4.b_3.b_2.b_1$.irm.cdg.org, where bi is the i-th bit of the IRM.

In an alternate embodiment the DNS name can be formed as $b_1b_2b_3b_4b_5b_6$.min.cdg.org (see FIG. 4B reference 440), $b_1b_2b_3b_4$.irm.cdg.org, (see FIG. 4C reference 460) and $b_1b_2b_3b_4b_5$.imsi.cdg.org (see FIG. 4D reference 480) for MIN, IRM, and IMSI, respectively.

The DNS query is forwarded through the DNS hierarchy to the DNS server authorized by cdg.org. The DNS server contains the MSID-to-Home_Network mapping in the form of DNS resource records. If the MSID prefix bits are resolved to a home network, the DNS server replies with a DNS Response that contains the domain name of the home network. For example, if the IRM prefix bits are 1918, the name in the DNS Query is 8.1.9.1.irm.cdg.org received. The DNS server has a resource record mapping 8.1.9.1.irm to kddi.com, which is the domain name of KDDI owning the IRM prefix 1918. Thus, the DNS Response contains kddi.com.

Figure 5:
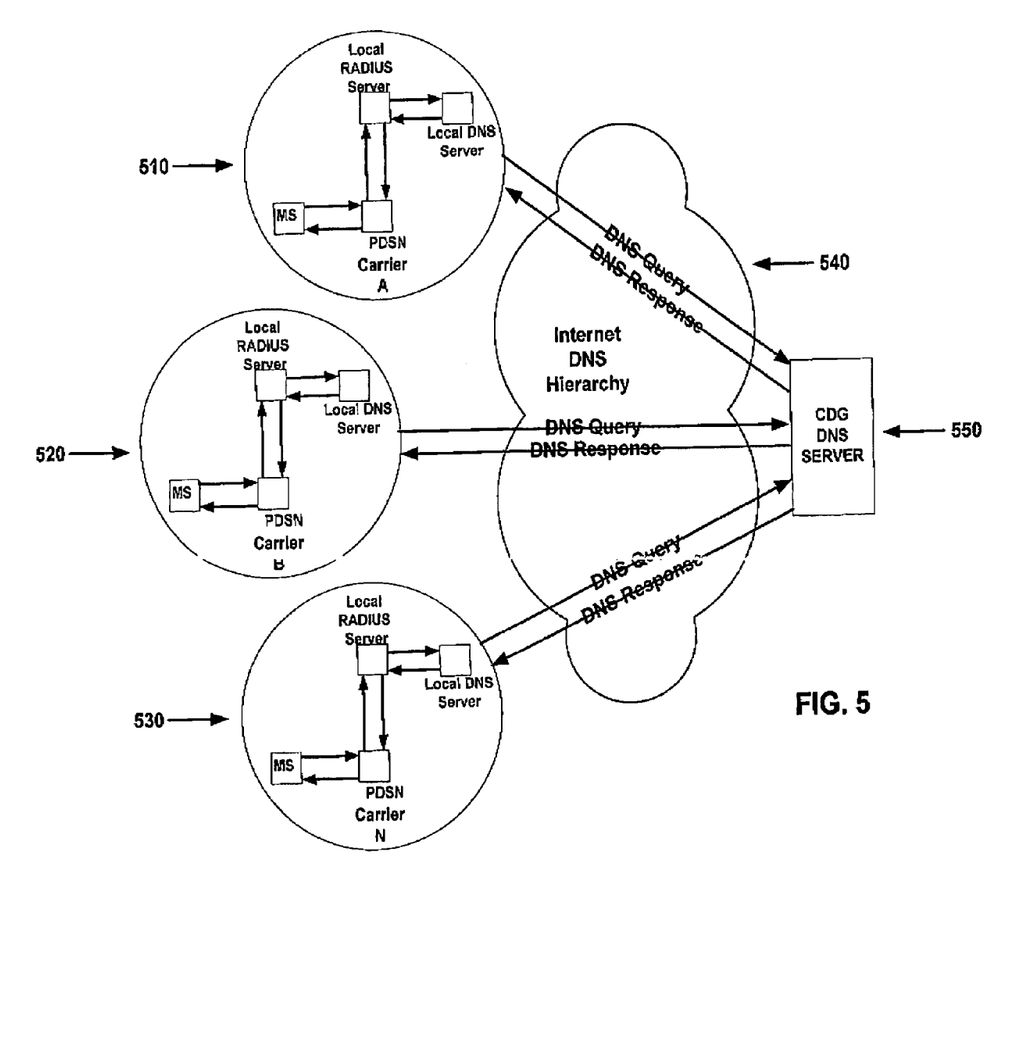
FIG. 5 is a schematic diagram of a plurality of local carriers in communication with the remote centralized server of one embodiment of the present invention.

FIG. 5 is a schematic diagram of multiple local carriers 510, 520 and 530 formulating and forwarding domain name requests to CDG DNS server 550 via the Internet 540. This figure serves to illustrate the consolidation of the home network information in a centralized server. If any of the home network information needs to be updated, the new data can simply be stored in the CDG DNS server 550. There is no need to update data in each of local networks 510, 520 and 530. When it is necessary for any of these local networks to access the home network information to identify the home network associated with a particular MS, the information is retrieved from the CDG DNS server 550 via an appropriate DNS query.

It should be noted that numerous variations may be made in the embodiments described above without departing from the scope of the invention as detailed in the claims below. Some of these variations are mentioned above. For instance, upon receiving the identification of a home network associated with a MS, the local RADIUS server may examine locally stored roaming agreements or contact a RADIUS server associated with the home network to determine whether or not to authorize local network access by the MS. Another variation involves the use of usernames/passwords to authorize access by the MS. It may or may not be necessary to use these usernames/passwords, and if they are used, they may consist of unique or non-unique usernames/passwords. Yet another variation relates to the identification of the MS for purposes of further identifying the corresponding home network. The description of the foregoing embodiments points out the potential use of MIN, IRM or IMSI MSID information, but other types of information could alternatively be used to identify the MS. A number of variations of the DNS queries based on these different types of identifying information are also described above. These examples are similarly intended to be illustrative of the possible variations and wide scope of the various embodiments of the invention. It should therefore be noted that variations which are not explicitly included in the present disclosure will nevertheless be apparent to persons of skill in the art upon reading this disclosure and are therefore considered to be within the scope of the disclosure and the claims below.

Although not discussed in detail above, it should be noted that the functionality described above may be implemented in the servers described above by providing suitable programs that are executed in the respective processing subsystems of these devices. These program instructions are typically embodied in a storage medium that is readable by the respective processing subsystems. Exemplary storage media may include RAM memory, flash memory, ROM memory, EPROM memory, EEPROM memory, registers, hard disk, a removable disk, a CD-ROM, or any other form of storage media known in the art. Such a storage medium embodying program instructions for implementing the functionality described above comprises an alternative embodiment of the invention.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method comprising:
    receiving, at a local server, a request by a mobile station for roaming access to a local radio access network (RAN) associated with the local server, the request containing at least a portion of a non-Internet Protocol-based mobile station ID (non-IP-based MSID) associated with the mobile station, wherein at least the portion of the non-IP-based MSID in the request comprises only a prefix;
    accessing, by the local server, a remote centralized domain name system (DNS) server to determine a home network domain name associated with the mobile station based on at least the portion of the non-IP-based MSDI of the mobile station, wherein the DNS server contains a mapping of home network domain names and at least a portion of associated non-IP-based MSIDs comprising only prefixes of the non-IP-based MSIDs of associated mobile stations; and
    granting or denying access of the mobile station to the local network based at least in part upon the determination of the home network domain name associated with the mobile station.

2. The method of claim 1, wherein the method is implemented in a local remote authentication dial-in user service (RADIUS) server.

3. The method of claim 1, wherein the method is implemented in a visitor locator register (VLR).

4. The method of claim 1, wherein the non-IP-based MSID is selected from the group consisting of: a mobile identification number (MIN), an international roaming MIN (IRM), and an international mobile subscriber identity (IMSI).

5. The method of claim 1, further comprising locally storing a set of roaming agreements, and determining whether the home network domain name associated with the mobile station is among one or more networks for which corresponding mobile station users have authorization via one of the set of roaming agreements to access the local network.

6. The method of claim 1, further comprising querying a remote RADIUS server associated with the home network domain name associated with the mobile station to determine whether the mobile station is authorized to access the local network.

7. The method of claim 1, further comprising caching information received in response to accessing the remote centralized server.

8. The method of claim 1, wherein the mapping is maintained under the authority of a single organization independent of the home networks.

9. The method of claim 1, wherein the accessing of the remote centralized DNS server by the local server further comprises sending an access request including the non-IP-based MSID to the remote centralized DNS server, and further comprising receiving a response to the access request, wherein the response includes the home network domain name if the mapping at the remote centralized DNS server associates the non-IP-based MSID to one of the home network domain names in the mapping.

10. A method comprising:
maintaining in a remote centralized domain name system (DNS) server a central database containing a mapping of home network domain names and at least a portion of non-Internet Protocol-based mobile station IDs (MSIDs) of associated mobile stations comprising only prefixes of the non-IP-based MSIDs of associated mobile stations;
coupling the central database through an Internet DNS hierarchy to a plurality of local servers, wherein access by a roaming mobile station to one or more of the plurality of local servers is based on a home network domain name associated with at least a portion of a non-Internet Protocol-based mobile station ID (non-IP-based MSID) of the roaming mobile station;
receiving a query over the Internet DNS hierarchy from one of the plurality of local servers based on receipt by the local server of a request from the roaming mobile station to access a local network associated with the local server, wherein the query includes at least the portion of the non-IP-based MSID of the roaming mobile station requesting access to the local network associated with the local server, and wherein at least the portion of the non-IP-based MSID in the query comprises only a prefix; and
identifying the home network domain name associated with the roaming mobile station based on at least the portion of the non-IP-based MSID of the roaming mobile station and the mapping contained in the central database of the DNS server.

11. The method of claim 10, wherein the non-IP-based MSIDs are selected from the group consisting of: mobile identification numbers (MINs), international roaming MINs (IRMs), and international mobile subscriber identities (IMSIs).

12. The method of claim 10, further comprising:
receiving queries from one or more additional local servers, wherein the queries include at least a portion of respective non-IP-based MSIDs associated with one or more additional mobile stations requesting access to one or more additional local networks associated with the additional local servers; and
identifying one or more additional home networks network domain names associated with the additional mobile stations.

13. The method of claim 10, wherein the identifying further comprises determining that the non-IP-based MSID is associated with one of the home network domain names in the mapping, and further comprising sending a response to the query, wherein the response includes the home network domain name.

14. An apparatus comprising:
a local server associated with a local network, wherein the local server is configured to:
receive a request by a mobile station for roaming access to the local network, the request containing at least a portion of a non-Internet Protocol-based mobile station ID (non-IP-based MSID) associated with the mobile station, wherein at least the portion of the non-IP-based MSID in the request comprises only a prefix,
access a remote centralized domain name server (DNS) to determine a home network domain name associated with the mobile station based on at least the portion of the non-IP-based MSID of the mobile station, wherein the DNS server contains a mapping of home network domain names and at least a portion of associated non-IP-based MSIDs comprising only prefixes of the non-IP-based MSIDs of associated mobile stations, and
grant or deny access of the mobile station to the local network based at least in part upon the determination of the home network domain name associated with the mobile station.

15. The apparatus of claim 14, wherein the local server comprises a remote authentication dial-in user service (RADIUS) server.

16. The apparatus of claim 14, wherein the local server comprises a visitor locator register (VLR).

17. The apparatus of claim 14, wherein the local server is configured to generate a domain name server (DNS) query and to transmit the query to the centralized DNS.

18. The apparatus of claim 17, wherein the local server is configured to format the DNS query to include at least the portion of the non-IP-based MSID associated with the mobile station.

19. The apparatus of claim 14, wherein the non-IP-based MSID is selected from the group consisting of: a mobile identification number (MIN), an international roaming MIN (IRM), and an international mobile subscriber identity (IMSI).

20. The apparatus of claim 14, wherein the local server further comprises a local storage configured to store roaming agreement information and wherein the local server is configured to determine whether the home network domain name associated with the mobile station is among one or more networks for which corresponding mobile station users have authorization via the roaming agreement information to access the local network.

21. The apparatus of claim 14, wherein the local server is coupled to a remote RADIUS server associated with the home network domain name associated with the mobile station and wherein the local server is configured to query the remote RADIUS server to determine whether the mobile station is authorized to access the local network.

22. The apparatus of claim 14, wherein the local server further comprises a local storage configured to cache information received in response to accessing the remote centralized server.

23. The apparatus of claim 14, wherein the central database is maintained under the authority of a single organization independent of the home networks.

24. The apparatus of claim 14, wherein the local server configured to access the remote centralized DNS server further comprises the local server configured to send an access request including the non-IP-based MSID to the remote centralized DNS server, and wherein the local server is further configured to receive a response to the access request, wherein the response includes the home network domain name if the mapping at the remote centralized DNS server associates the non-IP-based MSID to one of the home network domain names in the mapping.

25. An apparatus comprising:
a domain name system (DNS) server configured to:
maintain at least a portion of a central database containing a mapping of home network domain names and at least a portion of non-Internet Protocol-based mobile station IDs (non-IP-based MSIDs) of associated mobile stations comprising only prefixes of the non-IP-based MSIDs of associated mobile stations;

receive one or more queries over an Internet DNS hierarchy from one or more of a plurality of local servers based on receipt by the plurality of local servers of a request from a roaming mobile station to access a local network associated with each of the local servers, wherein each of the one or more queries includes at least a portion of a non-IP-based MSID associated with a roaming mobile station requesting access to a corresponding local network associated with the corresponding local server, wherein at least the portion of the non-IP-based MSID in the one or more queries comprises only a prefix; and identify home domain names associated with the roaming mobile stations identified in the queries by comparing at least the portion of the non-IP-based MSIDs of the roaming mobile stations with the central database of the mapping of home network domain names and at least the portion of the associated non-IP-based MSIDs, wherein access of each roaming mobile station to one or more of the plurality of local servers is based on the home network domain name associated with each roaming mobile station.

26. The apparatus of claim 25, wherein the central database is maintained under the authority of a single organization independent of the home networks.

27. The apparatus of claim 25, wherein the non-IP-based MSIDs are selected from the group consisting of: mobile identification numbers (MINs), international roaming MINs (IRMs), and international mobile subscriber identities (IMSIs).

28. The apparatus of claim 25, wherein the DNS server configured to identify home networks domain names associated with the roaming mobile stations further comprises the DNS server configured to determine that one or more of the non-IP-based MSIDs are associated with one of the home network domain names in the mapping, and further comprising the DNS server configured to send one or more responses corresponding to the one or more queries, wherein the one or more responses include the respective one of the identified home network domain names associated with the respective one of the roaming mobile stations.

29. An apparatus comprising:
means for receiving, at a local server, a request by a mobile station for roaming access to a local radio access network (RAN) associated with the local server, the request containing at least a portion of a non-Internet Protocol-based mobile station ID (non-IP-based MSID) associated with the mobile station, wherein at least the portion of the non-IP-based MSID in the request comprises only a prefix;
means for accessing, by the local server, a remote centralized domain name system (DNS) server to determine a home network domain name associated with the mobile station based on at least the portion of the non-IP-based MSDI of the mobile station, wherein the DNS server contains a mapping of home network domain names and at least a portion of associated non-IP-based MSIDs comprising only prefixes of the non-IP-based MSIDs of associated mobile stations; and
means for granting or denying, at the local server, access of the mobile station to the local network based at least in part upon the determination of the home network domain name associated with the mobile station.

30. A non-transitory computer-readable storage medium comprising:

a first set of codes for causing a computer to receive, at a local server, a request by a mobile station for roaming access to a local radio access network (RAN) associated with the local server, the request containing at least a portion of a non-Internet Protocol-based mobile station ID (non-IP-based MSID) associated with the mobile station, wherein at least the portion of the non-IP-based MSID in the request comprises only a prefix;

a second set of codes for causing the computer to access a remote centralized domain name system (DNS) server to determine a home network domain name associated with the mobile station based on at least the portion of the non-IP-based MSDI of the mobile station, wherein the DNS server contains a mapping of home network domain names and at least a portion of associated non-IP-based MSIDs comprising only prefixes of the non-IP-based MSIDs of associated mobile stations; and a third set of codes for causing the computer to grant or deny access of the mobile station to the local network based at least in part upon the determination of the home network domain name associated with the mobile station.

31. An apparatus, comprising:
means for maintaining in a remote centralized domain name system (DNS) server a central database containing a mapping of home network domain names and at least a portion of non-Internet Protocol-based mobile station IDs (MSIDs) of associated mobile stations comprising only prefixes of the non-IP-based MSIDs of associated mobile stations;
means for coupling the central database through an Internet DNS hierarchy to a plurality of local servers, wherein access by a roaming mobile station to one or more of the plurality of local servers is based on a home network domain name associated with at least a portion of a non-Internet Protocol-based mobile station ID (non-IP-based MSID) of the roaming mobile station;
means for receiving a query over the Internet DNS hierarchy from one of the plurality of local servers based on receipt by the local server of a request from the roaming mobile station to access a local network associated with the local server, wherein the query includes at least the portion of the non-IP-based MSID of the roaming mobile station requesting access to the local network associated with the local server, and wherein at least the portion of the non-IP-based MSID in the query comprises only a prefix; and
means for identifying the home network domain name associated with the roaming mobile station based on at least the portion of the non-IP-based MSID of the roaming mobile station and the mapping contained in the central database of the DNS server.

32. A non-transitory computer-readable storage medium, comprising:
a first set of codes for causing a computer to maintain in a remote centralized domain name system (DNS) server a central database containing a mapping of home network domain names and at least a portion of non-Internet Protocol-based mobile station IDs (MSIDs) of associated mobile stations comprising only prefixes of the non-IP-based MSIDs of associated mobile stations;
a second set of codes for causing the computer to couple the central database through an Internet DNS hierarchy to a plurality of local servers, wherein access by a roaming mobile station to one or more of the plurality of local servers is based on a home network domain name associated with at least a portion of a non-Internet Protocol-based mobile station ID (non-IP-based MSID) of the roaming mobile station;

a third set of codes for causing the computer to receive a query over the Internet DNS hierarchy from one of the plurality of local servers based on receipt by the local server of a request from the roaming mobile station to access a local network associated with the local server, wherein the query includes at least the portion of the non-IP-based MSID of the roaming mobile station requesting access to the local network associated with the local server, and wherein at least the portion of the non-IP-based MSID in the query comprises only a prefix; and a fourth set of codes for causing the computer to identify the home network domain name associated with the roaming mobile station based on at least the portion of the non-IP-based MSID of the roaming mobile station and the mapping contained in the central database of the DNS server.

\* \* \* \* \*